United States Patent [19]
Schlosser et al.

[11] Patent Number: 5,836,597
[45] Date of Patent: Nov. 17, 1998

[54] DEVICE AND METHOD FOR ADJUSTING CAMBER AND/OR TOE

[75] Inventors: Richard D. Schlosser, Loveland; Gabriel Dragnea; Robert M. Allman, both of Longmont, all of Colo.

[73] Assignee: Specialty Products, Inc., Longmont, Colo.

[21] Appl. No.: 822,221

[22] Filed: Mar. 21, 1997

Related U.S. Application Data

[63] Continuation of Ser. No. 54,411, Apr. 28, 1993, Pat. No. 5,622,378, Continuation-in-part of Ser. No. 911,464, Jul. 10, 1992, abandoned.

[51] Int. Cl.⁶ .................................................... B62D 17/00

[52] U.S. Cl. .............................. 280/86.753; 280/87.751; 411/531

[58] Field of Search ................................ 280/661, 86.75, 280/86.751, 86.753, 86.754; 33/203, 613; 411/531

[56] References Cited

U.S. PATENT DOCUMENTS

| | | | |
|---|---|---|---|
| 2,826,462 | 3/1958 | Evans | 280/661 |
| 4,872,699 | 10/1989 | Grove et al. | 280/661 |

FOREIGN PATENT DOCUMENTS 1226128  9/1987  Canada .

*Primary Examiner*—Eric D. Culbreth
*Attorney, Agent, or Firm*—Klass, Law, O'Meara & Malkin, P.C.; Joseph J. Kelly

[57] ABSTRACT

A shim and method for using the same for adjusting camber and/or toe of a wheel assembly wherein first and second tapered annular shims are coupled together to permit relative rotation therebetween and each of the first and second tapered annular shims have visible indicia thereon. A chart is consulted to obtain an indicium on the first tapered annular shim that is to be aligned with an indicium on the second tapered annular shim so that the first and second tapered annular shims may be rotated to align the indicium on each shim so that the aligned indicia may be placed in the wheel assembly at a reference point on the wheel assembly to make the required camber and/or toe adjustments.

4 Claims, 10 Drawing Sheets

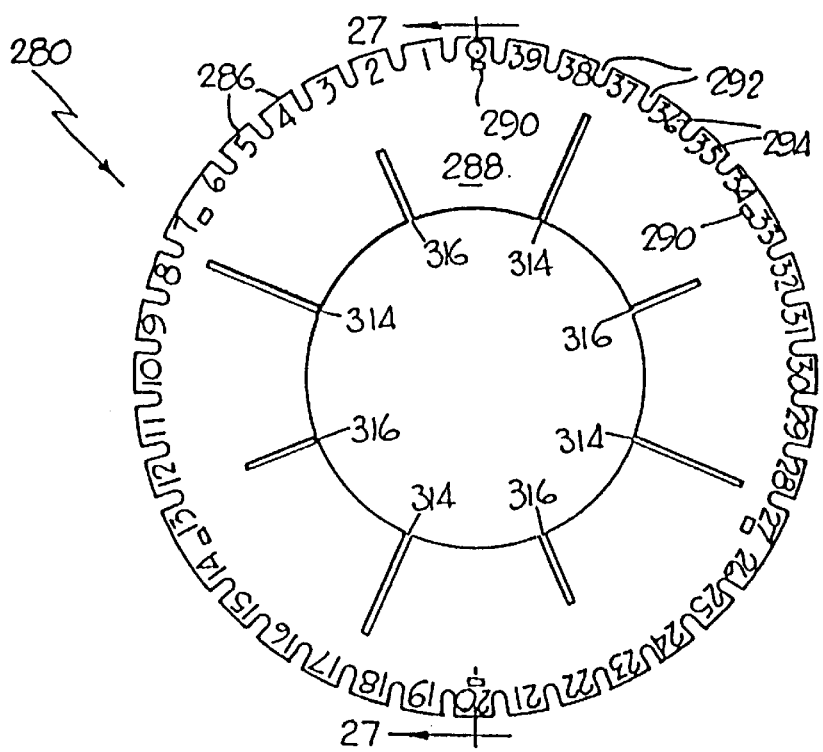
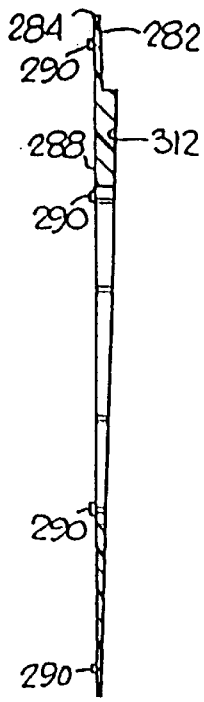
FIG.26
FIG.27
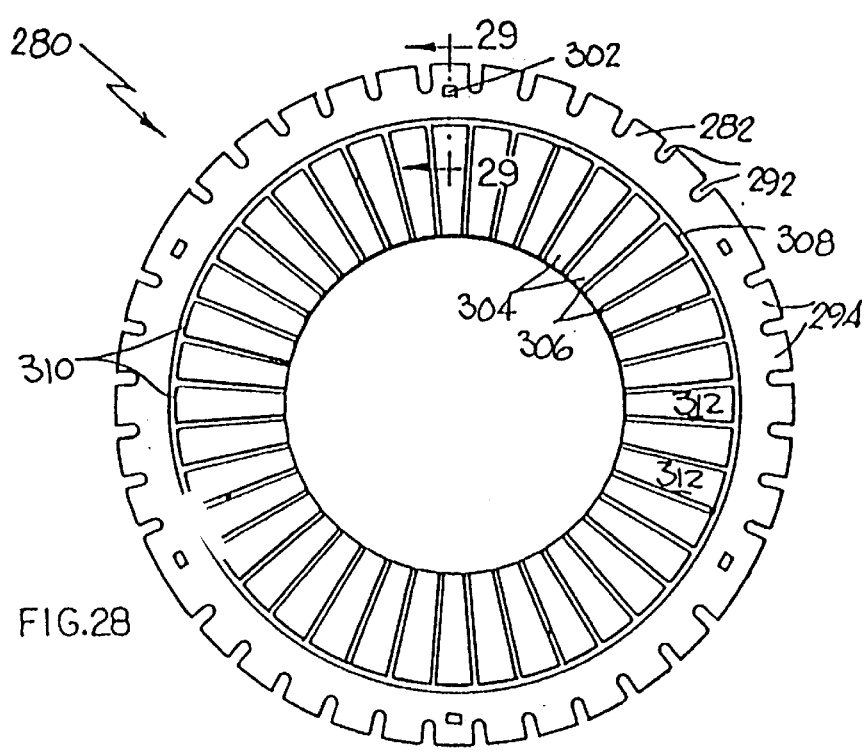
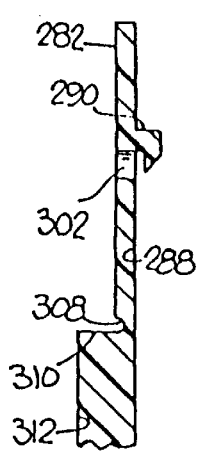
FIG.28
FIG.29

DEVICE AND METHOD FOR ADJUSTING CAMBER AND/OR TOE

This application is a continuation of application Ser. No. 08/054,411, filed Apr. 28, 1993, now U.S. Pat. No. 5,622,378, which is a continuation-in-part of application Ser. No. 07/911,464, filed Jul. 10, 1992, abandoned.

FIELD OF THE INVENTION

The invention relates generally to the adjustment of the camber and toe of a wheel assembly for purposes of alignment and more particularly to shim apparatus and a method for its use to accomplish the adjustment.

BACKGROUND OF THE INVENTION

In U.S. Pat. No. 4,684,150 issued to Specktor et al, there is disclosed a shim for adjusting camber and toe of a wheel assembly. The shim is provided with notches so that a selected notch may be located against a particular bolt to place the shim at a desired location in the wheel assembly. A series of shims having different tapers are provided. One surface of the shim is provided with indicia for use in selecting the notch that is to be placed against the bolt. Conventional apparatus is used to determine the required camber and toe needed to adjust the wheel assembly. A chart is provided and has values of camber and toe. At the intersection of the measured required and toe, the chart indicates the size of the shim to be used and the notch that is to be placed against the bolt. In column 6, lines 32 to 34, the Specktor et al patent states that if one shim does not adjust the camber and toe the desired amount, two shims can be used in combination. However, the Specktor et al patent does not explain how to use the two shims in combination. Canadian Patent No. 1,226,128 issued to Johnson also discloses two shims but offers no explanation of how they are to be used. Also, there are no indicia on the shims in Johnson. There is no disclosure in Specktor et al or Johnson of any means for joining the two shims together. In the use of the apparatus in Specktor et al, it would appear that after the first shim was applied, the chart would again be consulted to determine the size of the second shim and the notch to be placed against the bolt. Therefore, there would be no cooperation between the indicia on the first shim and the indicia on the second shim.

BRIEF DESCRIPTION OF THE INVENTION

This invention provides a shim device for adjusting the camber and/or toe alignment of a wheel in a vehicle wheel assembly which includes a spindle for rotatably supporting a wheel, a spindle face plate, an axle, an axle face plate and a plurality of bolts received through the spindle face plate and the axle face plate for detachably, operably coupling the spindle face plate to the axle face plate with the shim device located therebetween comprising first and second tapered annular shims which are joined together to permit relative rotational movement therebetween. A first surface on each of the first and second tapered annular shims is provided with indicia so that an indicium on the first tapered annular shim may be aligned with an indicium on the second tapered annular shim to obtain a previously measured required adjustment of camber and/or toe. A method for selecting the indicium on each of the first and second tapered annular shims is also provided.

In a preferred embodiment of the invention, the shim device comprises a first tapered annular shim, a second tapered annular shim and joining means for coupling the first and second tapered annular shims together and for permitting relative rotational movement therebetween. In addition to permitting relative rotation between the upper and lower tapered annular shims, the joining means maintains the centers of the upper and lower tapered annular shims in alignment before, during and after installation in the wheel assembly. Each of the first and second tapered annular shims has oppositely facing first and second surfaces, an outer edge and an inner edge. The first surfaces face in the same direction and the second surfaces face in the same direction. Indicia are provided on the first surface of and adjacent to the outer edge of each of the first and second tapered annular shims so that a desired indicium on the first surface of the first annular tapered shim may be aligned with a desired indicium on the first surface on the second annular tapered shim. The second annular tapered shim has a diameter greater than the diameter of the first tapered annular shim so that the indicia on the first and second tapered annular shims are clearly visible.

The first tapered annular shim comprises a first tapered ring and a second tapered ring spaced from the first tapered ring and a plurality of spaced apart radially extending non-tapered spokes integral with the first and second tapered annular rings and holding the first and second tapered rings in the spaced apart relationship. The second tapered annular shim comprises a first tapered and a second ring having at least a tapered portion spaced from the first tapered ring and a plurality of spaced apart radially extending non-tapered spokes integral with the first tapered ring and the at least a tapered portion of the second ring and holding the first tapered ring and the second ring in the spaced apart relationship. The second ring also has a non-tapered portion integral with the at least a tapered portion and extending radially outwardly therefrom. The second tapered ring of the first tapered annular shim has oppositely facing first and second surfaces, an outer edge and an inner edge and has indicia on the first surface and the non-tapered portion of the second tapered annular shim has oppositely facing first and second surfaces with the first surface facing in the same direction as the first surface of the second tapered ring and an outer edge and has indicia on the first surface so that a desired indicium on the surface of the second tapered ring may be aligned with a desired indicium on the first surface of the non-tapered portion. The non-tapered portion has a diameter greater than the diameter of the second tapered ring so that the indicia on the first surfaces of the second tapered ring and the non-tapered portion are clearly visible. The spokes are non-tapered.

The joining means comprise a plurality of spaced apart arcuate projections on the first tapered ring of the first tapered annular shim. Each annular projection has an inner surface and an outer surface and the outer surface has an annular recess formed therein. The first tapered ring of the second tapered annular shim has an inner surface having a first portion having a diameter less than the diameter of the remaining portion of the inner surface to form an annular rim. The annular rim and the annular recess are dimensioned so that the annular rim fits into said annular recess and permits relative rotational movement therebetween. The first and second tapered annular shims are formed from a material, such as nylon or other plastics having similar characteristics, having sufficient resiliency to permit the annular rim to be moved over the outer surface to move the arcuate projections radially inwardly and snap into the annular recess.

In another preferred embodiment of the invention, an intermediate tapered ring is located between the first and second tapered rings and the first, intermediate and second tapered rings are held together in a radially spaced apart relationship. In one embodiment, the intermediate tapered ring comprises a plurality of circumferentially spaced apart recesses formed thereon which recesses extend in radial opposite directions to form a plurality of sections which can readily be separated to provide clearance for the bolts. In another embodiment, the intermediate ring comprises a plurality of circumferentially spaced apart arcuate members held in the spaced apart relationship by the spokes so that they can be readily separated to provide the clearance for the bolts.

The invention provides a method for adjusting the camber and/or toe of a vehicle wheel assembly having a wheel spindle, an axle and a plurality of bolts operably coupling the wheel spindle to the axle which is commenced by measuring the alignment of the wheel to determine the adjustments of toe and/or camber required to bring the wheel into proper alignment. A chart is provided and has printed thereon the required indicium on the first and the second tapered annular shims to be placed in radial alignment for a plurality of combinations of camber and/or toe adjustments. The intersections of the measured camber and toe adjustments are found on the chart and at such intersection the chart will indicate the indicium on the first tapered annular shim to be placed in radial alignment with an indicium on the second tapered annular shim to obtain the required camber and toe adjustments. The first and second tapered annular shims are rotated until the indicium obtained from the chart on the first tapered annular shim and the indicium obtained from the chart on the second tapered annular shim are in radial alignment. The shim apparatus is then installed on the wheel assembly with the radially aligned indicium at a reference point on the wheel assembly.

In another preferred embodiment of the invention, the shim device comprises a first shim having a first generally planar surface with at least a portion thereof adapted to contact the spindle face plate and a second shim having a first generally planar surface with at least a portion thereof adapted to contact the axle face plate. Each of the first and second shims has a second generally planar surface with at least portions of the second generally planar surfaces adapted to be in a contacting relationship. Also, each of the first and second shims has indicia thereon and located so that the indicia on each of the first and second shims are visible when the at least portions of the second generally planar surfaces are in the contacting relationship. At least portions of one of the first and second generally planar surfaces of each of the first and second shims lie in non-parallel planes so that at least a portion of each of the first and second shims has a generally tapered profile. Each of said first and second shims has a plurality of removable portions so that at least some of the plurality of removable portions can be removed to provide clearance for the bolts. Joining means are provided for joining the first and second shims together so that the first and second shims may be installed between the spindle face plate and the axle face plate with a desired indicium on the first shim radially aligned with a desired indicium on the second shim so that the joined together first and second shims are at a desired location relative to the spindle face plate and the axle face plate. Each of the first and second shims are annular and the joining means permit relative rotational movement between the first and second shims but prevent relative axial or radial movement therebetween.

Each of the first and second shims comprise an annular member having a radially outwardly extending portion which is of reduced axial thickness. The annular member is of uniform thickness in the axial and radial directions as is the radially outwardly extending portion. Indicia are provided on the upper surface of the annular member. A plurality of circumferentially spaced apart radially extending members are integral with and project axially outwardly from the annular member adjacent radially extending members and are connected together by a relatively thin webbing. The circumferentially spaced apart radially extending members have tapered upper surfaces so that diameters passing through the circumferentially spaced apart radially extending members have an axially thickest part and an axially thinnest part. An integral annular portion is of reduced axial thickness between the circumferentially spaced apart radially extending members and the annular member so that each of the circumferentially spaced apart radially extending members may be readily separated by severing the webbing between adjacent ones of the circumferentially spaced apart radially extending members and the annular portion between the annular member and the circumferentially spaced apart radially extending members. At least some of adjacent ones of the circumferentially spaced apart radially extending members are separated by a slot extending in a radial direction for the same radial extent as each of the circumferentially spaced apart radially extending members. At least others of adjacent ones of the circumferentially spaced apart radially extending members are separated by a partial slot extending in a radial direction for less than the radial extent of each of circumferentially spaced apart radially extending members.

The joining means comprise and holding means which project axially outwardly from the annular portion of the second shim and overlying at least portions of the radially outwardly extending portion. The holding means comprise a plurality of projections extending axially outwardly from the annular member of the second shim and spaced apart in a circumferential direction and each of the plurality of projections having a radially inwardly extending portion overlying at least a portion of the radially outwardly extending portion. The holding means are in frictional engagement with portions of the radially outwardly extending portion for permitting relative rotational movement between the first and second shims but preventing relative or axial movement therebetween.

In another preferred embodiment of the invention, the device comprises a first shim comprising a tapered annular member and a plurality of circumferentially spaced apart tapered members extending in a radial direction relative to the tapered annular member and integral with the tapered annular member. Each of the plurality of circumferentially spaced apart tapered members has and outer edge portion and an indicium thereon adjacent to the outer edge portion. The second shim comprises a tapered annular member and a plurality of circumferentially spaced apart tapered members extending in a radial direction relative to the tapered second annular member and integral with the tapered second annular member. Each of the plurality of circumferentially spaced apart tapered members of the second shim of each of the plurality of circumferentially spaced apart tapered members has an outer edge portion having a diameter greater than the diameter of the outer edge portion each of the plurality of circumferentially spaced apart tapered members of the second shim adjacent to the outer edge portion thereof of the first shim and indicia are located on so that the indicia on the tapered first and second shims are clearly visible and each indicium on the second shim is in radial alignment with the indicium on one of the plurality of circumferentially spaced apart tapered members of the first shim. The joining means provide a frictional resistance between the tapered annular members of the first and second shims to permit relative rotational movement therebetween so that an indicium on the first shim may be radially aligned with an indicium on the second shim but to retain the first and second shims in the radially aligned relationship during installation.

In another preferred embodiment of the invention, the device comprises a first shim comprising a non-tapered annular member and a plurality of circumferentially spaced apart tapered members integral with the non-tapered annular member and extending in radial directions relative thereto. Adjacent ones of the circumferentially spaced apart tapered members are joined together adjacent to the inner periphery thereof by a relatively thin webbing. The non-tapered annular member has a plurality of circumferentially spaced apart indicium thereon. The second shim comprises a non-tapered annular member and a plurality of circumferentially spaced apart tapered members integral with the non-tapered annular member and extending in radial directions relative thereto. Adjacent ones of the circumferentially spaced apart tapered members are joined together adjacent to the inner periphery thereof by a relatively thin webbing. The non-tapered annular member of the second shim has an outer diameter greater than the outer diameter of the non-tapered annular member of the first shim and has a plurality of circumferentially spaced apart indicium thereon and located so that the indicia on the first and second shims are visible.

In another embodiment of the invention, the device comprises a first tapered annular shim and a separate second tapered annular shim. Each of the first and second tapered annular shims has oppositely facing first and second surfaces, an outer edge and a inner edge. Indicia are on the first surface of an adjacent to the outer edge of each of the first and second tapered annular shims. The outer edge of the second tapered annular shim has a diameter greater than the diameter of the outer edge of the first tapered annular shim so that the indicia on the first and second tapered annular shims are clearly visible when the first tapered annular shim is superposed over the second tapered annular shim with their longitudinal axes in alignment and so that a desired indicium on the first tapered annular shim may be radially aligned with an indicium on the second tapered annular shim to define a desired angular camber and/or toe adjustment for the wheel.

In another preferred embodiment of the invention, the device comprises an annular member having circumferentially spaced apart indicium thereon and a plurality of circumferentially spaced apart radially extending members integral with the annular member. The circumferentially spaced apart radially extending members have tapered surfaces so that diameters passing through the circumferentially spaced apart radially extending members have an axially thickest part and an axially thinnest part. At least portions of a plurality of adjacent ones of the circumferentially spaced apart radially extending members being connected together by a relatively thin webbing. The annular portion is radially spaced from the circumferentially spaced apart radially extending members by a relatively thin annular groove so that each of the circumferentially spaced apart radially extending members may be readily separated by severing the portion of the webbing between adjacent ones of the circumferentially spaced apart radially extending members and along a portion of the annular groove between the annular member and the circumferentially spaced apart radially extending members. At least some of adjacent ones of the circumferentially spaced apart radially extending members are separated by a slot extending in a radial direction for the same radial extent of each of the circumferentially spaced apart radially extending members and at least others of adjacent ones of the circumferentially spaced apart radially extending members are partially separated by a slot extending in a radial direction for a radial extent less than the radial extent of each of the circumferentially spaced apart radially extending members.

A preferred method for adjusting camber and/or toe alignment of a wheel in a vehicle wheel assembly is provided which wheel assembly includes a spindle for rotatably supporting a wheel, a spindle face plate, an axle, an axle face plate and a plurality of bolts received through the spindle face plate and the axle face plate for detachably, operably coupling the spindle face plate to the axle face plate using a shim device comprising a first shim having a first generally planar surface with at least a portion thereof adapted to contact the spindle face plate; a second shim having a first generally planar surface with at lest a portion thereof adapted to contact the axle face plate and each of the first and second shims having a second generally planar surface with at least portions of the second surfaces adapted to be in a contacting relationship and wherein each of the first and second shims having indicia thereon and located so that the indicia on each of the first and second shims are visible when the at least portions of said second surfaces are in the contacting relationship and at least portions of one of the first and second surfaces of each of the first and second shims lying in non-parallel planes so that at least a portion of each of the first and second shims has a generally tapered profile and each of the first and second shim having a plurality of removable portions so that at least some of the plurality of removable portions can be removed to provide clearance for the bolts wherein the method comprises measuring the alignment of the wheel to determine the adjustment of camber and/or toe required to bring the wheel into proper alignment providing a chart having printed thereon the required indicium on the first and the second shims to be placed in radial alignment for a plurality of combinations of camber and toe adjustments locating the intersection of the measured required camber and/or toe adjustments and the intersection reading from the chart the indicium on the first shim to be placed in radial alignment with the indicium on the second shim providing a template having printed thereon the identification of the portions of the removable portions to be removed to accommodate the bolts when the indicium on the first or second shims are placed in alignment with a reference mark on the template removing the portions of the removable portions joining the first and second shims so that the indicium on the first shim remains in alignment with the indicium on the second shim; and installing the joined together first and second shims between the spindle face plate and the axle face plate.

BRIEF DESCRIPTION OF THE DRAWINGS

Illustrative and presently preferred embodiments of the invention are shown in the accompanying drawings in which:

FIG. 26 is a top plan view of another lower tapered shim of this invention;

FIG. 27 is a cross-sectional view taken on the line 27—27 of FIG. 26;

FIG. 28 is a bottom plan view of FIG. 26;

FIG. 29 is an enlarged cross-sectional view taken on the line 29—29 of FIG. 28;

DETAILED DESCRIPTION OF THE INVENTION

Figure 1:
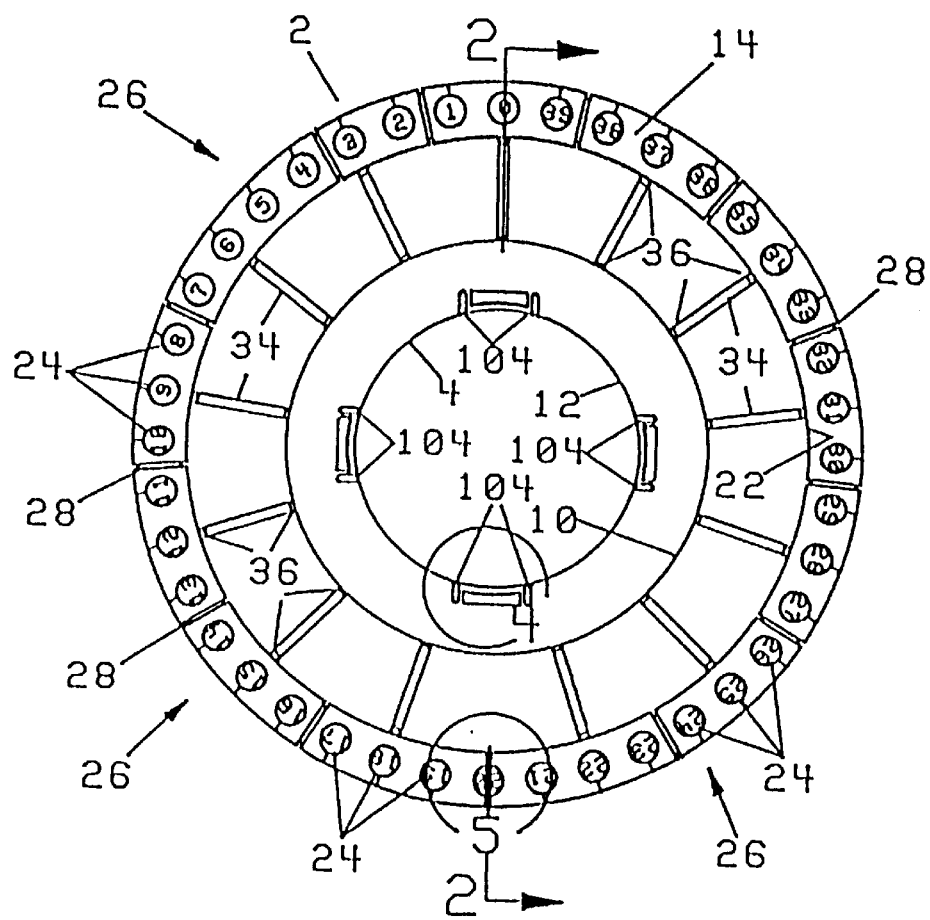
FIG. 1 is a top plan view of an upper tapered annular shim of this invention.

The terms upper and lower as used herein are for illustration purposes only and have no relationship to the actual use of the shim device of this invention. The shim device of this invention is to be used between the axle face plate and the spindle face plate as illustrated in FIG. 1 of U.S. Pat. No. 4,872,699, which is incorporated herein by reference thereto.

Figure 2:
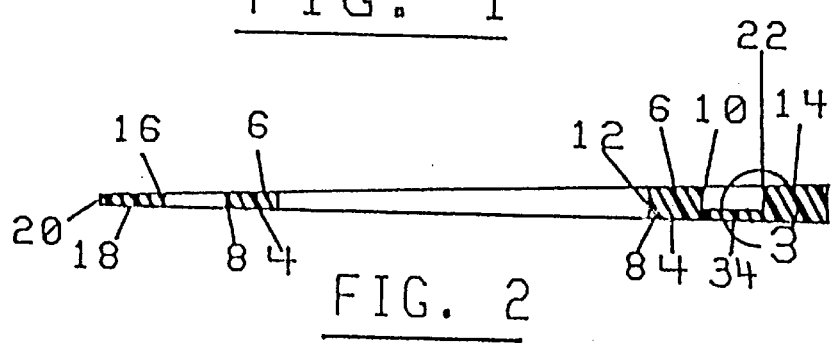
FIG. 2 is a cross-sectional view taken on the line 2—2 of FIG. 1 and rotated through 90 degrees.
Figures 3, 4, 5:
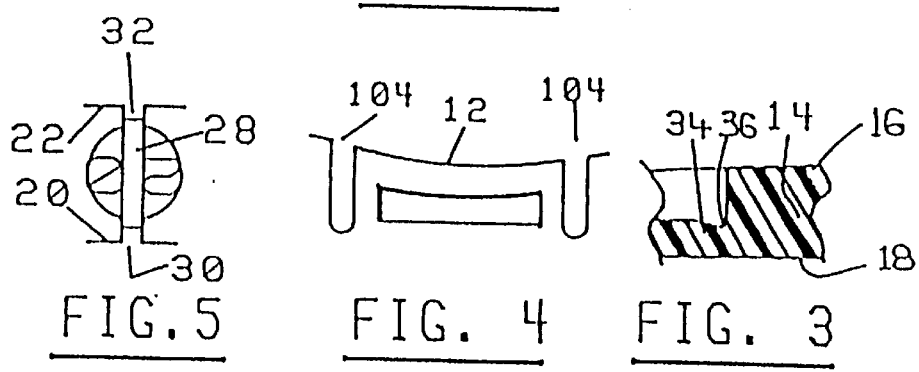
FIG. 3 is an enlarged portion of FIG. 2.
FIG. 4 is an enlarged portion of FIG. 1.
FIG. 5 is an enlarged portion of FIG. 1.

In FIGS. 1 and 2, there is illustrated the first or upper tapered annular shim 2 of this invention. The upper tapered annular shim 2 has a first ring 4 having a tapered upper surface 6, a flat lower surface 8, an outer edge 10 and an inner edge 12. The upper tapered annular shim 2 also has a second tapered ring 14 having a tapered upper surface 16, a flat lower surface 18, an outer edge 20 and an inner edge 22. The tapered upper surface 16 has a plurality of equally spaced apart indicia 24 thereon and located between the outer edge 20 and the inner edge 22. The second tapered ring 14 is divided into a plurality of sectors 26 by recessed portions 28 in the upper surface 18, FIG. 5, which terminate short of the outer edge 20 and the inner edge 22 to form outer and inner notches 30 and 32. The recessed portions 28 and the notches 30 and 32 permit each sector 26 to be removed by breaking two adjacent recessed portions 28 to provide clearance for other equipment mounted on the wheel assembly. The first and second tapered rings 4 and 14 are held in a spaced apart concentric relationship by a plurality of integral, radially extending, spaced apart non-tapered spokes 34. Each of the spokes has radially spaced apart recessed portions 36, FIG. 3, so that each spoke 34 can be removed by breaking the recessed portions 36.

In the embodiment illustrated in FIG. 1, there are thirteen spokes 34 and thirteen sectors 26. The maximum thickness of the upper tapered annular shim 2 is about 0.75 inch and the minimum thickness is about 0.25 inch. Each spoke 34 is non-tapered and has a thickness of about 0.025 inch. The recessed portions 28 have a thickness of about 0.15 inch. The minimum thickness of the recessed portions 36 adjacent to the first and second tapered rings 4 and 14 is about 0.015 inch. The inner edge 12 has a diameter of about 1.452 inches, the outer edge 10 has a diameter of about 2.165 inches, the inner edge 22 has a diameter of about 3.190 inches and the outer edge 20 has a diameter of about 3.740 inches. It is understood that the foregoing dimensions are given for illustration purposes only.

Figure 6:
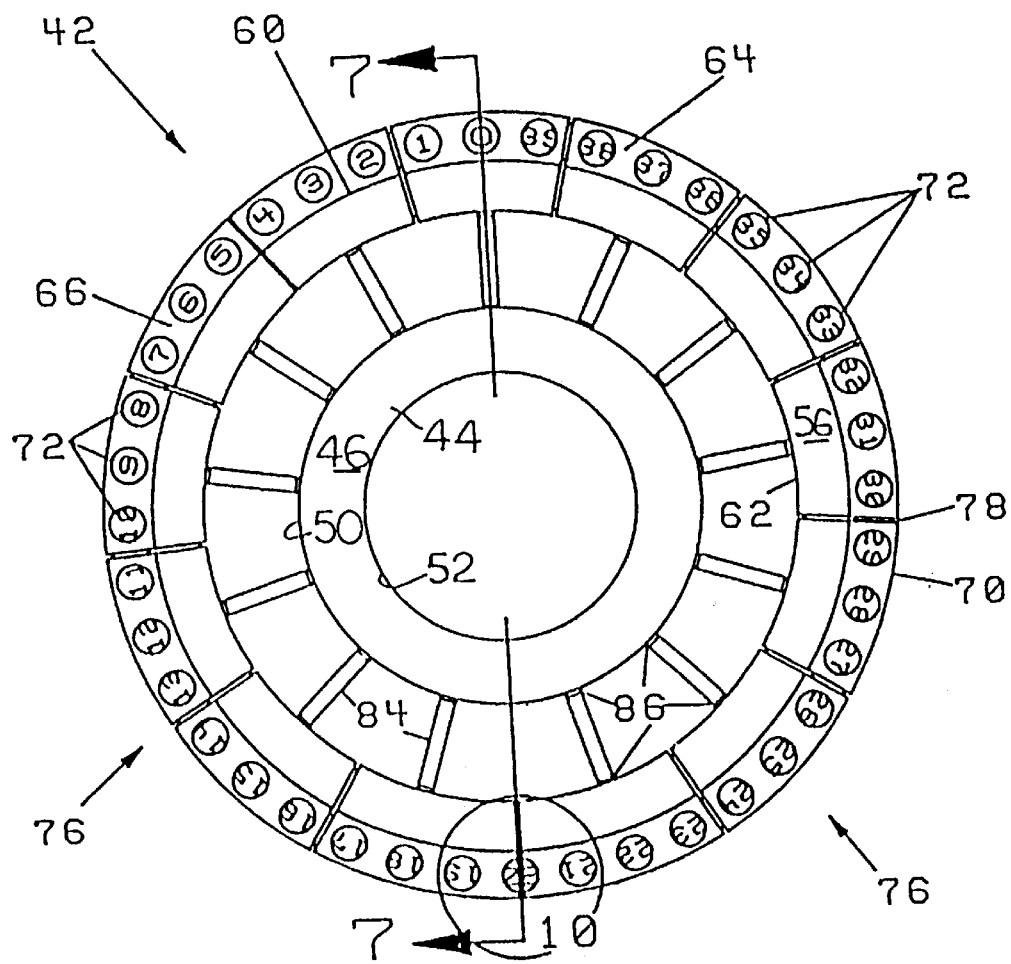
FIG. 6 is a top plan view of a lower tapered annular shim of this invention.
Figure 7:
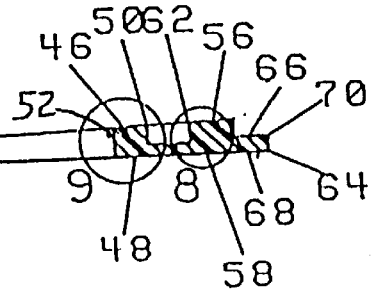
FIG. 7 is a cross-sectional view taken on the line 7—7 of FIG. 6 and rotated through 90 degrees.
Figure 10:
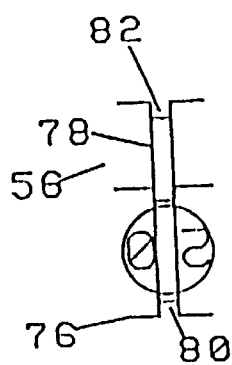
FIG. 10 is an enlarged portion of FIG. 6.
Figure 9:
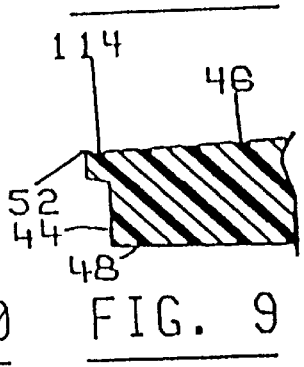
FIG. 9 is an enlarged portion of FIG. 6.
Figure 8:
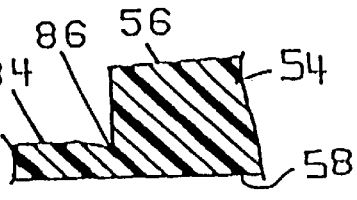
FIG. 8 is an enlarged portion of FIG. 7.

In FIGS. 6 and 7, there is illustrated the second or lower tapered annular shim 42 of this invention. The lower tapered annular shim 42 has a first ring 44 having a tapered upper surface 46, a flat lower surface 48, an outer edge 50 and an inner edge 52. The lower tapered annular shim 42 has a second ring 54 having a tapered upper surface 56, a flat lower surface 58, an outer edge 60 and an inner edge 62. An integral extension member 64 projects radially outwardly from the second tapered ring 54 and has a flat upper surface 66, FIG. 7, a flat lower surface 68 and an outer edge 70. The upper surface 66 has a plurality of equally spaced apart indicia 72 thereon and located between the outer edge 60 and the outer edge 70. The second tapered ring 54 is divided into a plurality of sectors 76 by recessed portions 78 in the upper surfaces 56 and 66, FIG. 10, which terminate short of the outer edge 70 and the inner edge 62 to form outer and inner notches 80 and 82. The recessed portions 78 and the notches 80 and 82 permit each sector 76 to be removed by breaking two adjacent recessed portions 78. The first tapered ring 44 and the second ring 54 are held in a spaced apart concentric relationship by a plurality of integral radially extending, spaced apart non-tapered spokes 84. Each of the spokes 84 has radially spaced apart recessed portions 86, FIG. 8, so that each spoke 84 can be removed by breaking at the recessed portions 86.

In the embodiment illustrated in FIG. 6, there are thirteen spokes 84 and thirteen sectors 76. The maximum thickness of the upper tapered annular shim 2 is about 0.75 inch and the minimum thickness is about 0.25 inch. Each spoke 84 is non-tapered and has a thickness of about 0.025. The recessed portions 78 are non-tapered and have a thickness of about 0.15 inch. The minimum thickness of the recessed portions 86 adjacent to the first and second tapered rings 44 and 54 is about 0.015 inch. The inner edge 52 has a diameter of about 1.540 inches, the outer edge 50 has a diameter of about 2.165 inches, the inner edge 62 has a diameter of about 3.190 inches and the outer edge 60 has a diameter of about 3.740 inches. The extension member has a thickness of about 0.25 inch and the outer diameter 70 is about 4.250 inches. It is understood that the foregoing dimensions are given for illustration purposes only.

Figure 11:
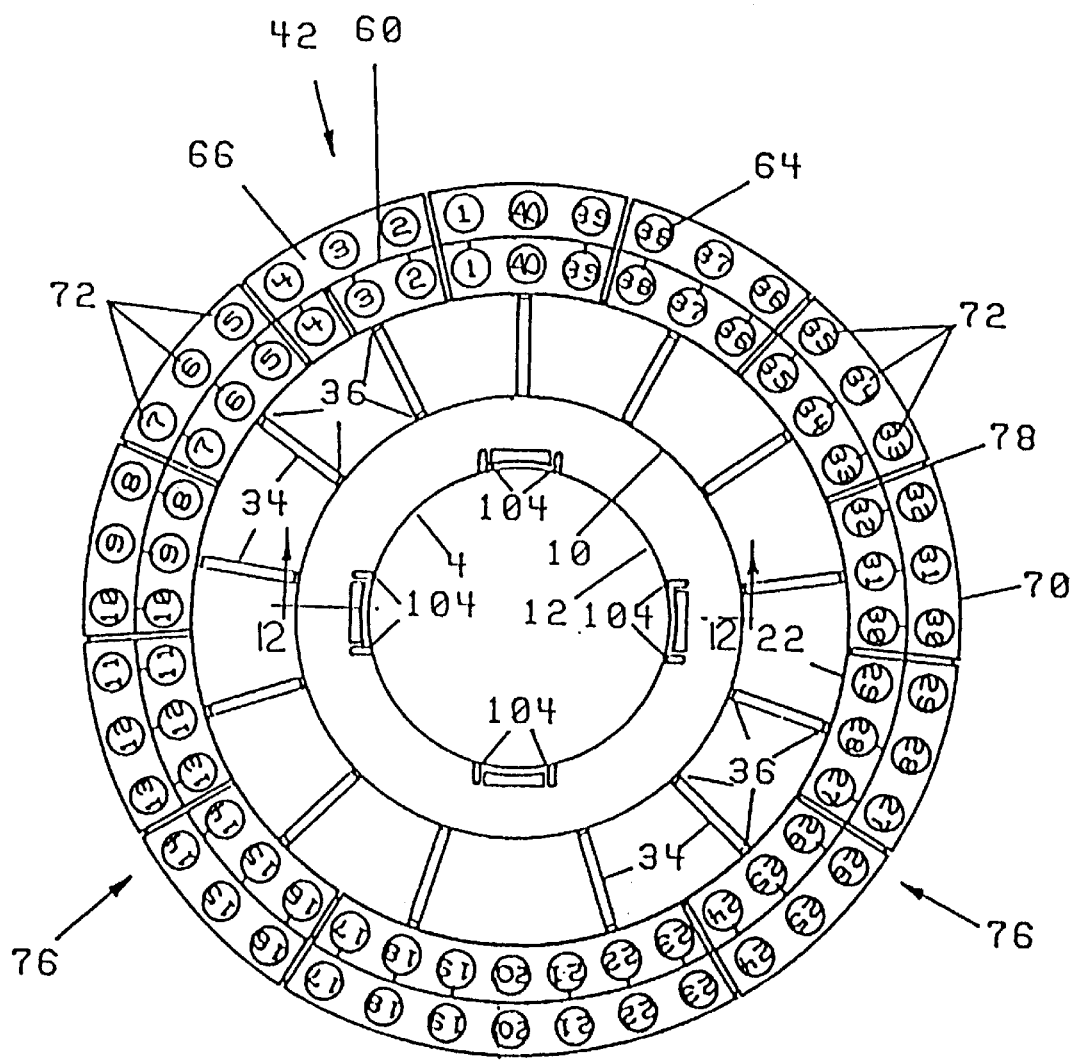
FIG. 11 is a top plan view of the upper and lower tapered annular shims coupled together.
Figure 12:
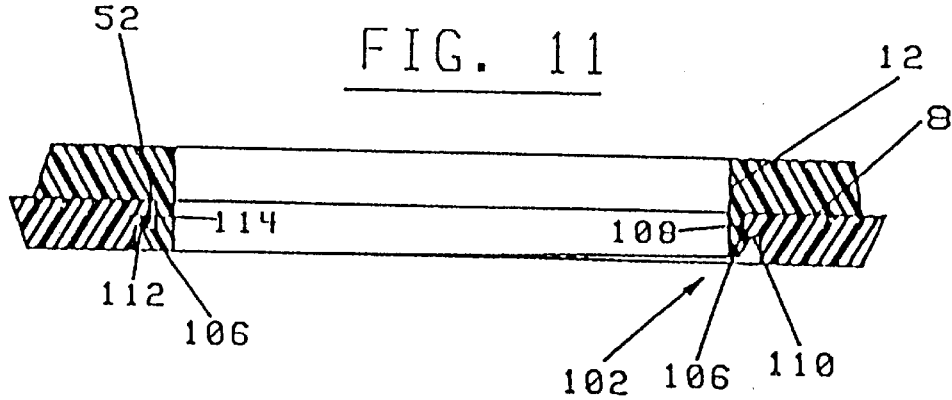
FIG. 12 is a cross-sectional view taken on the line 12—12 of FIG. 11 and rotated through 90 degrees.

Joining means 102, FIG. 12, are provided for joining the upper taper annular shim 2 and the lower tapered annular shim 42 together and to permit relative rotational movement therebetween. In addition to permitting relative rotation between the upper and lower tapered annular shims, the joining means maintains the centers of the upper and lower tapered annular shims in alignment before, during and after installation in the wheel assembly. A pair of spaced apart slots 104, FIGS. 1, 4 and 11 at a plurality of spaced apart locations project inwardly from the inner edge 12. Between each pair of slots 104, a hook like portion 106 projects downwardly from the flat lower surface 8 so that there are four spaced apart hook like portions 106. The inner surface of each hook like portion 106 is a continuation of the inner edge 12. An arcuate recess 108 is formed in the outer surface 110 of each hook like portion 106. An annular recess 112 is formed in the inner surface 52 so as to form an annular rim 114. The annular rim 114 and the arcuate recesses 108 are dimensioned so that the annular rim 114 fits into the arcuate recesses 108 to hold the upper tapered annular shim 2 and the lower tapered annular shim 42 together while permitting relative rotational movement therebetween but preventing any relative radial or axial movement therebetween. The upper and lower tapered annular shims 2 and 42 are joined together by placing the tapered upper surfaces 46 and 56 beneath the flat lower surfaces 8 and 18 and moving the inner edge 52 against the tapered surface of the hook like portions 106. A force is applied to the upper and lowered tapered annular shims 2 and 42 so that the annular rim 114 forces the hook like portions 106 radially inwardly until it reaches the arcuate recesses 108 at which time the hook like portions 106 resile radially outwardly to hold the upper and lower tapered annular shims 2 and 42 together. As illustrated in FIG. 11, the diameter of the extension member 64 is greater than the diameter of the second tapered ring 14 so that the indicia 24 and 72 are clearly visible when the upper and lower tapered annular shims 2 and 42 are coupled together.

Figure 13:
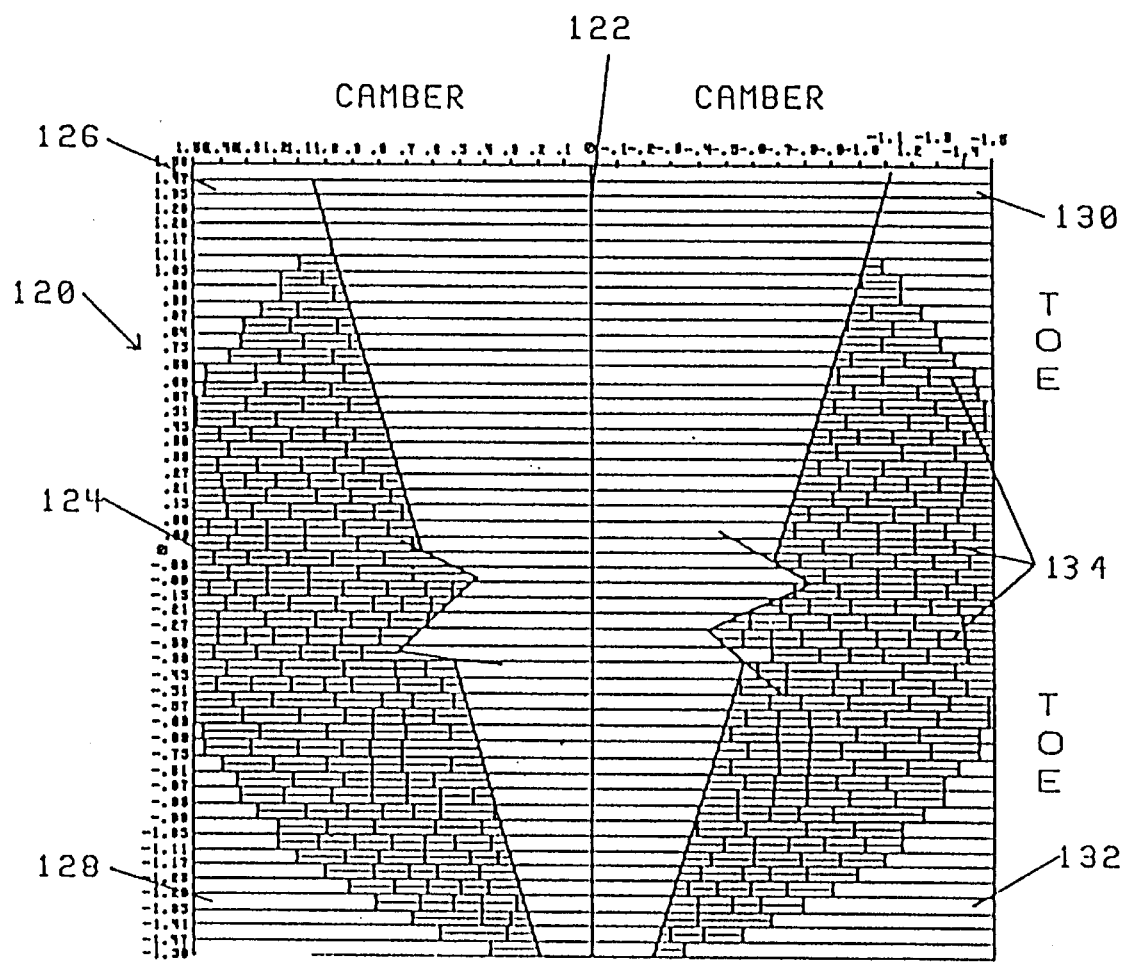
FIG. 13 is a chart for use with this invention.
Figure 14:
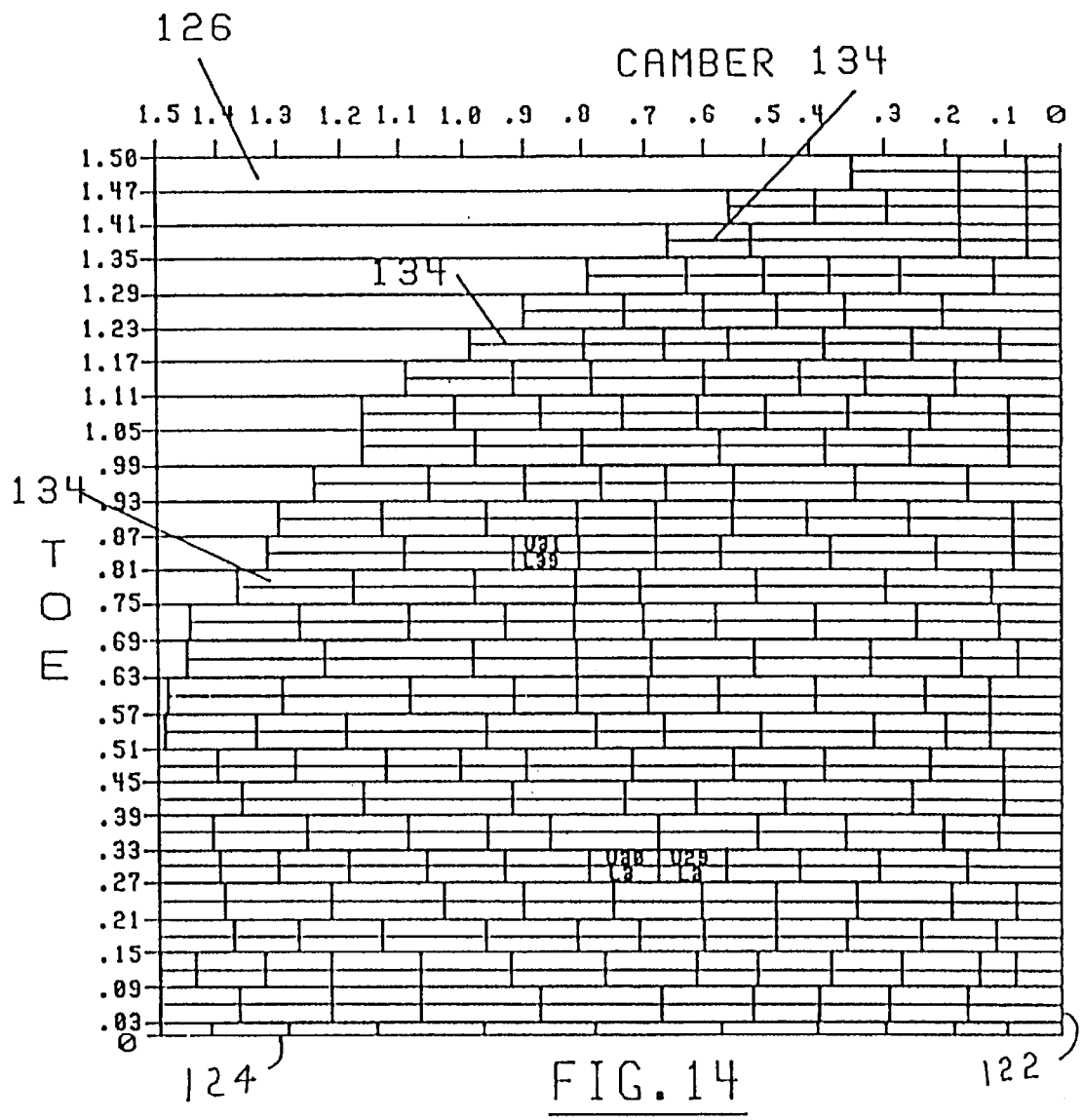
FIG. 14 is an enlarged view of the upper left quadrant of the chart in FIG. 13.

In FIG. 13, there is illustrated a chart 120 for use in determining the relative locations of the upper and lower tapered annular shims 2 and 42 to make a required camber and toe adjustment. The chart 120 has a vertically extending zero degree line 122 and a horizontally extending zero degree line 124 to divide the chart into four quadrants, i.e., quadrant 126 is provided with values for positive camber and positive toe; quadrant 128 is provided with values for positive camber and negative toe; quadrant 130 is provided with values for negative camber and positive toe and quadrant 132 is provided with values of negative camber and negative toe. The numerical values of camber are from 0 to +1.5 and 0 to −1.5 degrees in increments of 0.1 degree and the numerical values of toe are from 0 to +1.5 and 0 to −1.5 degrees in increments of 0.06 degree. A plurality of spaced apart vertical and horizontal lines divide the chart into a plurality of boxes 134. In each box 134, a value for the upper and lower tapered annular shims 2 and 42 will be printed. In FIG. 14, three sets of values are illustrated but it is understood that values will be in each box of the chart. As described above, conventional apparatus (not shown) is used to measure a wheel assembly to determine the required values of camber and toe necessary to adjust the alignment of the wheel. As illustrated in FIG. 14, if the measured values of required camber and toe are camber +0.89 degree and toe +0.85 degree, the chart is consulted and indicates that number 31 on the upper tapered annular shim 2 should be radially aligned with number 39 on the lower tapered annular shim 42. After the upper and lower tapered annular shims 2 and 42 have been rotated to align U31 and L39, the upper and lower tapered annular shims 2 and 42 are installed on the wheel assembly with the radially aligned numbers, U31 and L39, at a twelve o'clock position. If the measure required adjustment were camber+0.62 degree and toe 0.42 degree, the intersection of these values on the chart would fall inbetween the box on the chart having the values U30 and L3 and the box having the values U29 and L3. The upper and lower tapered annular shims 2 and 4 would be rotated to place the number 3 on the lower tapered annular shim 42 in radial alignment with the space between the numbers 29 and 30 on the upper tapered annular shim 2 and then installed on the wheel assembly.

Prior to installing the aligned upper and lower tapered shims 2 and 42, a template such as Schlosser et al patent (U.S. Pat. No. 5,622,378) under Other Publications is used to determine which of the spokes 34 and 84 are to be removed to provide clearance for the bolts. The aligned reference numbers 3 and 42 are aligned with the arrow on the appropriate template and the spokes 34 and 84 to be removed are marked and then removed prior to installation on the wheel assembly.

Figure 15:
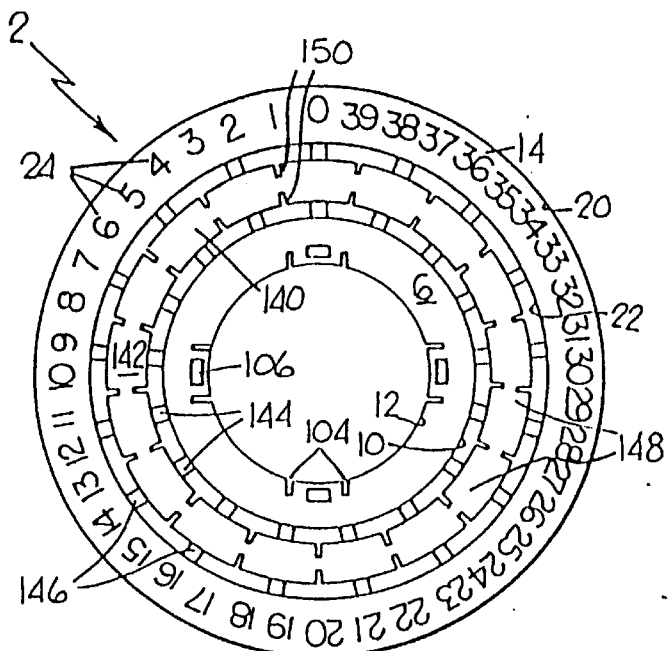
FIG. 15 is a top plan view of another upper tapered shim of this invention.

In FIG. 15, there is illustrated another preferred embodiment of an upper tapered shim which is similar to the upper tapered shim 2 in FIG. 1 except for the spokes 34. The parts in FIG. 15 corresponding to those in FIG. 1 have been given the same reference numerals. An intermediate ring 140 is located between the first ring 4 and the second ring 14 and has a tapered upper surface 142 and a flat bottom surface (not shown). A plurality of ribs 144 integral with the first ring 4 and the intermediate ring 140 and another plurality of ribs 146 integral with the intermediate ring 140 and the second ring 14 hold the intermediate ring 140 in position between the first 4 and second 14 rings. The taper of the intermediate ring 140 corresponds to the taper of the first and second rings 4 and 14. The intermediate ring 140 is divided into a plurality of sections 148 by aligned radial slots 150 so that the sections 148 may be broken away to provide clearance of the bolts as described above.

Figure 16:
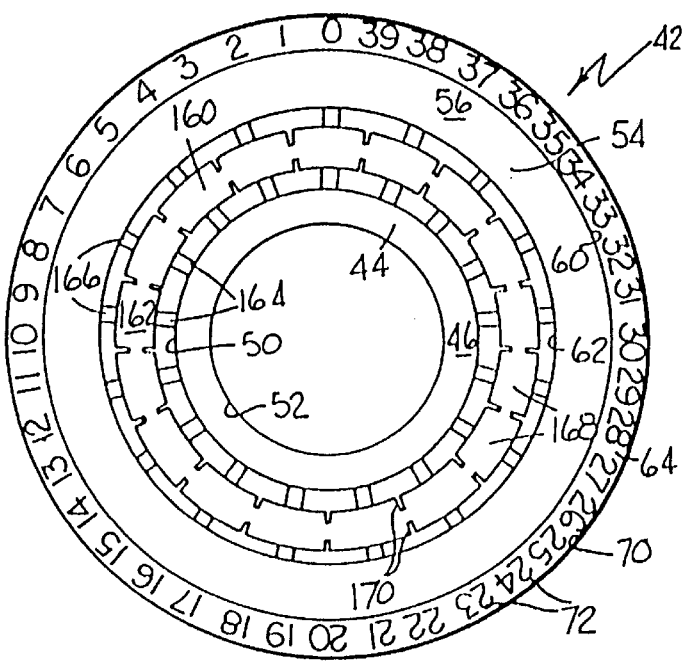
FIG. 16 is a top plan view of another lower tapered shim of this invention.

In FIG. 16, there is illustrated another preferred embodiment of a lower tapered shim which is similar to the lower tapered shim 42 of FIG. 6 except for the spokes 84. The parts in FIG. 16 corresponding to those in FIG. 6 have been given the same reference numerals. An intermediate ring 160 is located between the first ring 44 and the second ring 54 and has a tapered upper surface 162 and a flat bottom surface (not shown). A plurality of ribs 164 integral with the first ring 44 and the intermediate ring 160 and another plurality of ribs 166 integral with the intermediate ring 160 and the second ring 54 hold the intermediate ring 160 in position between the first and second rings 160 in position between the first and second rings 44 and 54. The taper of the intermediate ring 160 corresponds to the taper of the first and second rings 44 and 54. The intermediate ring 160 is divided into a plurality of sections 168 by aligned radial slots 170 so that the sections 168 may be broken away to provide clearance for the bolts as described above.

The upper tapered shim 2 of FIG. 15 is joined to the lower tapered shim 42 of FIG. 16 in the same manner as the upper tapered shim 2 of FIG. 1 is joined to the lower tapered shim 42 of FIG. 6 as illustrated in FIG. 11 and 12. The chart in FIGS. 13 and 14 is consulted and the upper and lower tapered shims 2 and 42 are rotated to align the desired indicium from the indicia 24 with the desired indicium from the indicia 74. The aligned upper and lower tapered shims 2 and 42 are then placed on a template, as described above, and the sections 148 and 168 to be removed are marked. After the sections 148 and 168 have been removed, the aligned upper and lower tapered shims 2 and 42 are installed on the wheel assembly with the aligned indicium at the twelve o'clock position.

If desired, the indicia 72 on the lower tapered shim 42 can be placed on the bottom side of the extension member 64 so that the upper and lower tapered shims 2 and 42 may be joined together with their flat surfaces in contacting relationship.

Figure 17:
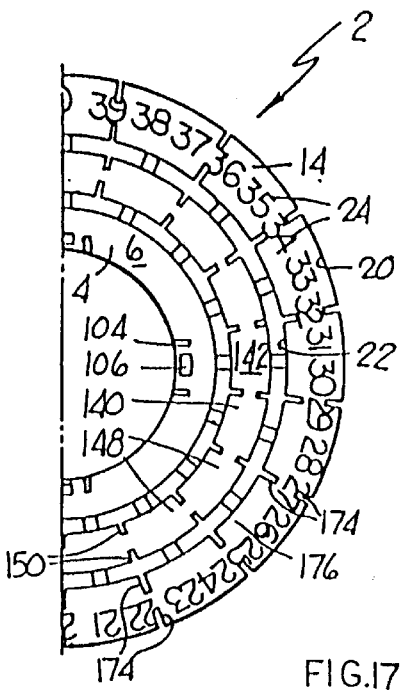
FIG. 17 is a top plan view of one-half of another upper tapered shim of this invention.

In FIG. 17, there is illustrated another preferred embodiment of an upper tapered shim which is similar to the upper tapered shim 2 of FIG. 15 except that the second ring 14 has been modified. The parts in FIG. 17 corresponding to those in FIG. 15 have been given the same reference numerals. In FIG. 17, the second ring 14 is provided with a plurality of radially aligned slots 174 to divide the second ring with a plurality of sectors 176 which may be broken away to provide clearance for other equipment mounted on the wheel assembly. The second ring 54 and the extension member 64 of the lower tapered shim 42 of FIG. 16 would be provided with aligned radial slots similar to the slots 174 to divide the second ring 54 and the extension member 64 into sectors that can be broken away similar to the sectors 176.

Figure 18:
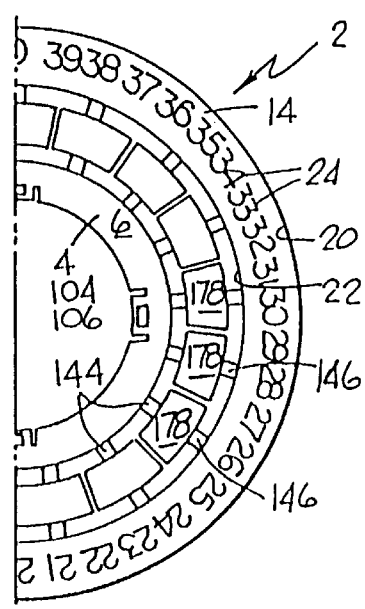
FIG. 18 is a top plan view of one-half of another upper tapered shim of this invention.

In FIG. 18, there is illustrated another preferred embodiment of an upper tapered shim which is similar to the upper tapered shim 2 in FIG. 15 except that the intermediate ring 140 has been modified. The parts in FIG. 18 corresponding to those in FIG. 15 have been given the same reference numerals. In FIG. 18, the intermediate ring 140 comprises a plurality of arcuate members 178 which are circumferentially spaced apart and held in this relationship by the ribs 144 and 146. The intermediate ring 160 of the lower tapered shim 42 would be modified in the same manner.

Figure 19:
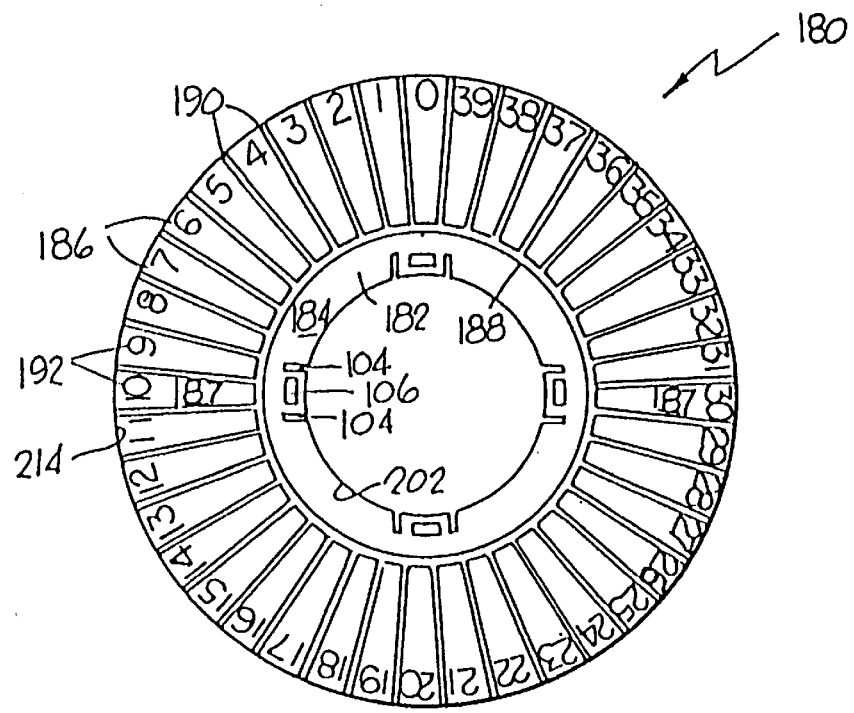
FIG. 19 is a top plan view of another upper tapered shim of this invention.

In FIG. 19, there is illustrated another preferred embodiment of an upper tapered shim 180. This upper tapered shim 180 is similar to the shim 20 in FIG. 3 of the above-identified '699 patent. The upper tapered shim 180 has a ring 182 having a tapered upper surface 184. A plurality of tabs 186 extend radially outwardly from the ring 182, have a tapered upper surface 187, and are integrally joined to the ring 182 by a relatively thin annular portion 188 so that each tab 186 may be readily broken away from the ring 182. The tabs 186 may be connected to each other by a relatively thin webbing 190 or the webbing 190 may not be used and each tab 186 would be separated by a slot (not shown). The ring 182 is provided with slots 104 and hook 106 similar to those in FIG. 1 to function as joining means as described above. Each tab 186 is provided with an indicium 192 for purposes described below.

Figure 20:
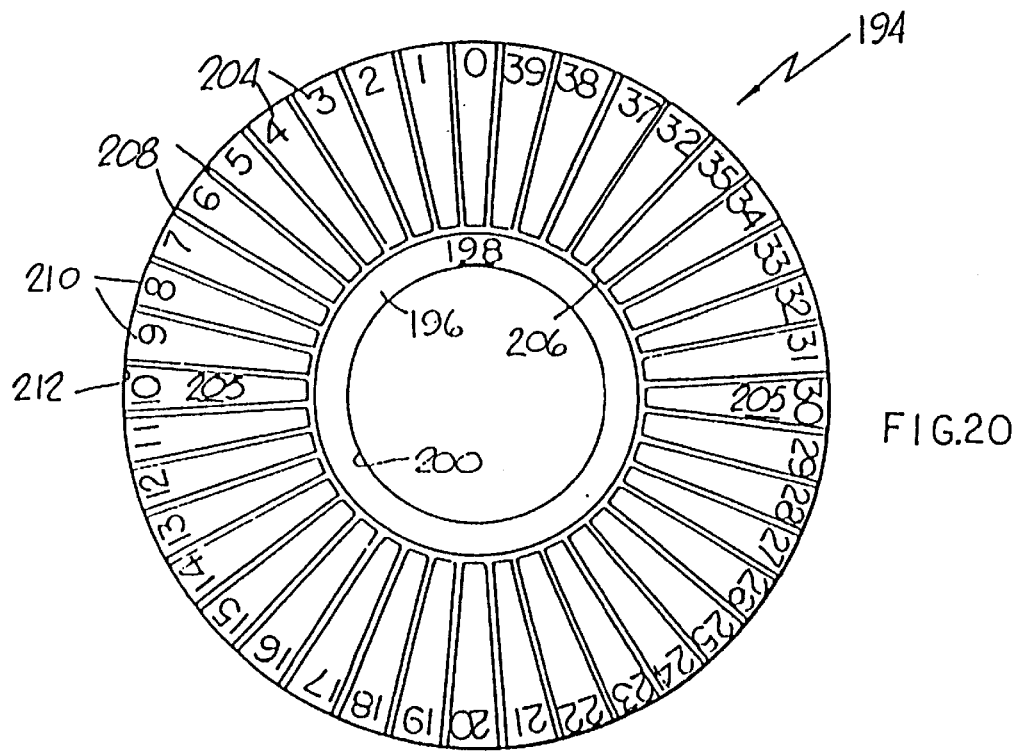
FIG. 20 is a top plan view of FIG. 19 superposed on another lower tapered shim of this invention.

In FIG. 20, there is illustrated a lower tapered shim 194 for use with the upper tapered shim 180. The lower tapered shim 194 has a ring 196 having a tapered upper surface 198 and an inner diameter 200 which is slightly larger than the inner diameter 202 of the ring 182 so that the upper tapered shim 180 may be joined to the lower tapered shim 194 as illustrated in FIG. 12. A plurality of tabs 204 extend radially outwardly from the ring 196, have a tapered upper surface 205, and are integrally joined to the ring 196 by a relatively thin annular portion 206 so that each tab 204 may be readily broken away from the ring 196. The tabs 204 may be connected to each other by a relatively thin webbing 208 or the webbing 208 may not be used and each tab 204 would be separated by a slot (not shown). Each tab 204 is provided with an indicium 210. The outer diameter 212 of each of the tabs 204 is larger than the outer diameter 214 of each of the tabs 186 so that when they are joined together the indicia formed by the indicium 192 and 210 are clearly visible.

After being joined together, the upper and lower tapered shims 180 and 194 are used in the same manner as described above in relation to the upper and lower tapered shims 2 and 42 of FIGS. 15 and 16. Also, the upper and lower tapered shims 180 and 194 could be joined together with their flat bottom surface (not shown) in contacting relationship.

Figure 21:
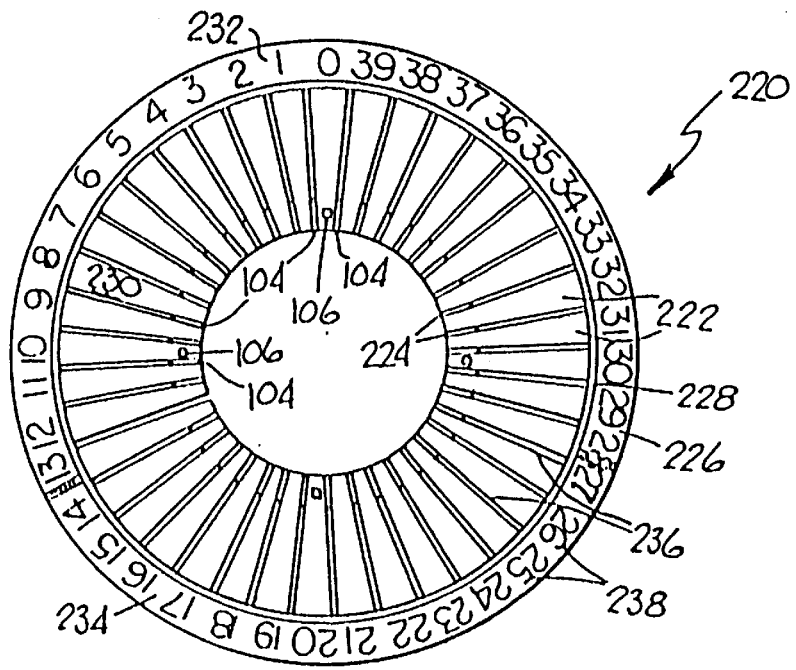
FIG. 21 is a top plan view of another upper tapered shim of this invention.

In FIG. 21, there is illustrated another preferred embodiment of an upper tapered shim 220. The upper tapered shim 220 comprises a plurality of tapered members 222 which extend in radial directions and adjacent tapered members 222 are joined together adjacent to the inner periphery thereof by relatively thin webbing 224. An outer ring 226 is integrally connected to the tabs 222 by relatively thin annular portion 228. The tabs 222 have an upper tapered surface 230 and a flat bottom surface (not shown). The outer ring 226 is non-tapered and has two sections 232 and 234 of differing axial thickness. Adjacent tabs 222 between the webbing 224 and the annular portion 228 are separated from each other by slots 236. Indicia 238 are provided on the upper surface of the outer ring 226 and each indicium is aligned with one of the tabs 222. The upper tapered shim 220 is provided with slots 104 and hooks 106 at four circumferentially spaced apart locations similarly to the upper tapered shim 2 in FIG. 1.

Figure 22:
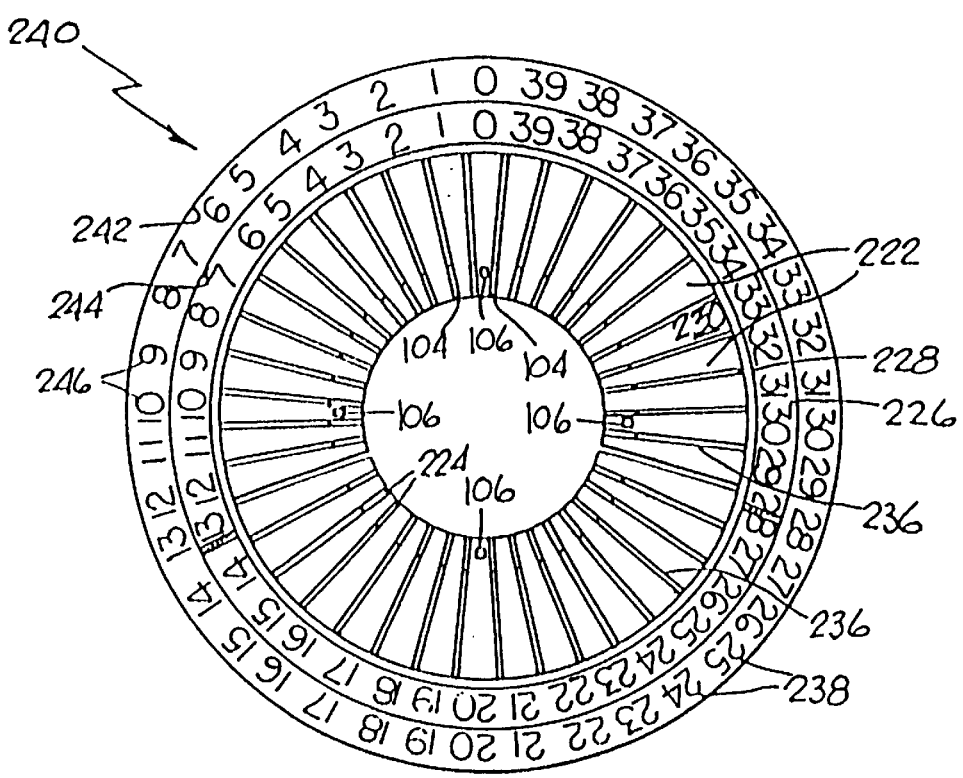
FIG. 22 is a top plan view of FIG. 21 superposed on another lower tapered shim of this invention.

In FIG. 22, there is illustrated the upper tapered shim 220 superposed over a lower tapered shim 240 with their axes in alignment. The lower tapered shim 240 is constructed the same as the upper tapered shim 220 except that the outer diameter 242 thereof is greater than the outer diameter 244 of the upper tapered shim 220 so that the indicia 246 thereon is clearly visible. The upper tapered shim 220 and the lower tapered shim 240 are joined together for relative rotational movement by structures similar to those illustrated in FIG. 12.

After being joined together, the upper and lower tapered shims 220 and 240 are used in the same manner as described above in relation to the upper and lower tapered shims 2 and 42 in FIGS. 15 and 16. Also, the upper and lower tapered shims could be joined together with their flat bottom surfaces (not shown) in contacting relationship.

Figures 23, 24, 25:
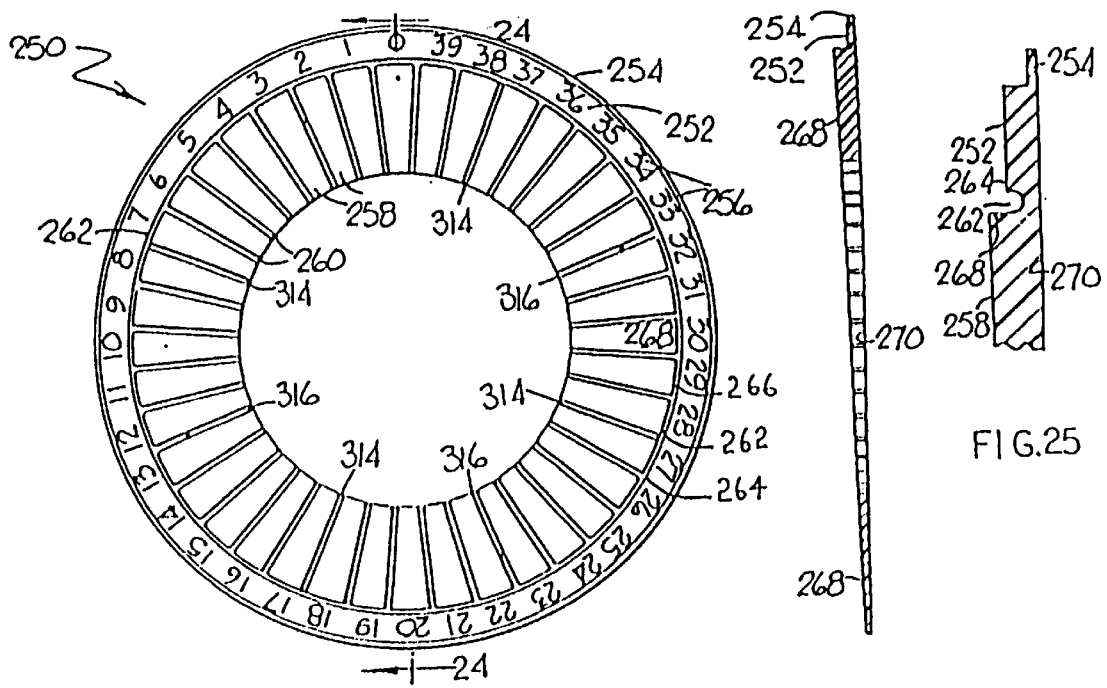
FIG. 23 is a top plan view of another upper tapered shim of this invention.
FIG. 24 is a cross-sectional view taken on the line 24—24 in FIG. 23.
FIG. 25 is an enlarged end portion of FIG. 24.

In FIGS. 23–25, there is illustrated another preferred embodiment of an upper tapered shim 250 of this invention. The upper tapered shim 250 has an annular member 252 having a radially outwardly extending portion 254 which is of a reduced axial thickness for purposes described below. The annular member 252 is of uniform thickness in axial and radial directions and the radially outwardly extending portion 254 is of uniform thickness in axial and radial directions. Indicia 256 are provided on the upper surface of the annular member 252. A plurality of radially extending members 258 are integral with the annular member 252 and are circumferentially spaced apart. Adjacent radially extending members 258 are connected together by a relatively thin webbing 260. An annular groove 262 is formed between the inner edge 264 of the annular member 254 and the radially outer extremities 266 of the radially extending members 258 and is integral with the annular member 252 and the radially extending members 258. The annular groove 262 has an axial thickness substantially the same as the axial thickness of the outwardly extending portion 254. Instead of the annular groove 262, each of the radially extending members can be connected to the annular member 254 by a spoke similar to the spokes 146 of FIG. 15. The radially extending members 258 have an upper tapered surface 268 and the outwardly extending portion 254, the annular member 252, the radially extending members 258, the annular groove 262 and the webbing 260 have a common flat bottom surface 270. The axial thickest portion of the upper tapered shim 250 is that portion of the radially extending member 258 adjacent the 0 indicium and the axial thinnest portion of the tapered portion of the upper tapered shim 250 is that portion of the radially extending member 258 adjacent the 20 indicium. All portions of the radially extending members 258 have an axial thickness greater than the axial thickness of the annular member 252.

In FIGS. 26–29, there is illustrated another preferred lower tapered shim 280 which is dimensioned to cooperate with the upper tapered shim 250 as described below. The lower tapered shim 280 has an annular member 282 which is of uniform thickness in axial and radial directions. The annular member 282 has an outer edge portion 284 and indicia 286 are provided on the upper surface 288 adjacent to the outer edge portion 284. A plurality of hook like portions 290 project outwardly from the upper surface 288, FIG. 29, in an axial direction for purposes described below. A plurality of radially extending notches 292 divide portions of the annular member 282 into segments 294 which may be readily removed if necessary. The upper surface 288 except for the hook like portions 290 is flat.

The bottom surface of the lower tapered shim 280 is illustrated in FIG. 28. A plurality of openings 302 extend through the annular member 282 and are in axial alignment with the hook like portions 290. A plurality of radially extending members 304 are integral with the annular member 282 and are circumferentially spaced apart. Adjacent radially extending members are connected together by a relatively thin webbing 306. An annular groove 308 is formed in the annular member 282 adjacent to the radially outer extremities 310 of the plurality of radially extending members 304. As described above, the annular groove 308 can be replaced by a plurality of spokes. The radially extending members 304 have a tapered upper surface 312. The axial thickest portion of the lower tapered shim 280 is that portion of the radially extending member 304 adjacent to the O indicium 286 and the axial thinnest portion of the tapered portion of the lower tapered shim 280 is that portion of the radially extending member 304 adjacent the 20 indicium 286.

A plurality of slots 314 are formed between adjacent ones of the circumferentially spaced apart radially extending members 304 and extend radially inwardly to the annular groove 308. Another plurality of slots 316 are formed between other adjacent ones of the circumferentially spaced apart radially extending members 304 and extend radially inwardly for a distance less than the radial extent of the slots 314.

Figures 30, 31, 32, 33:
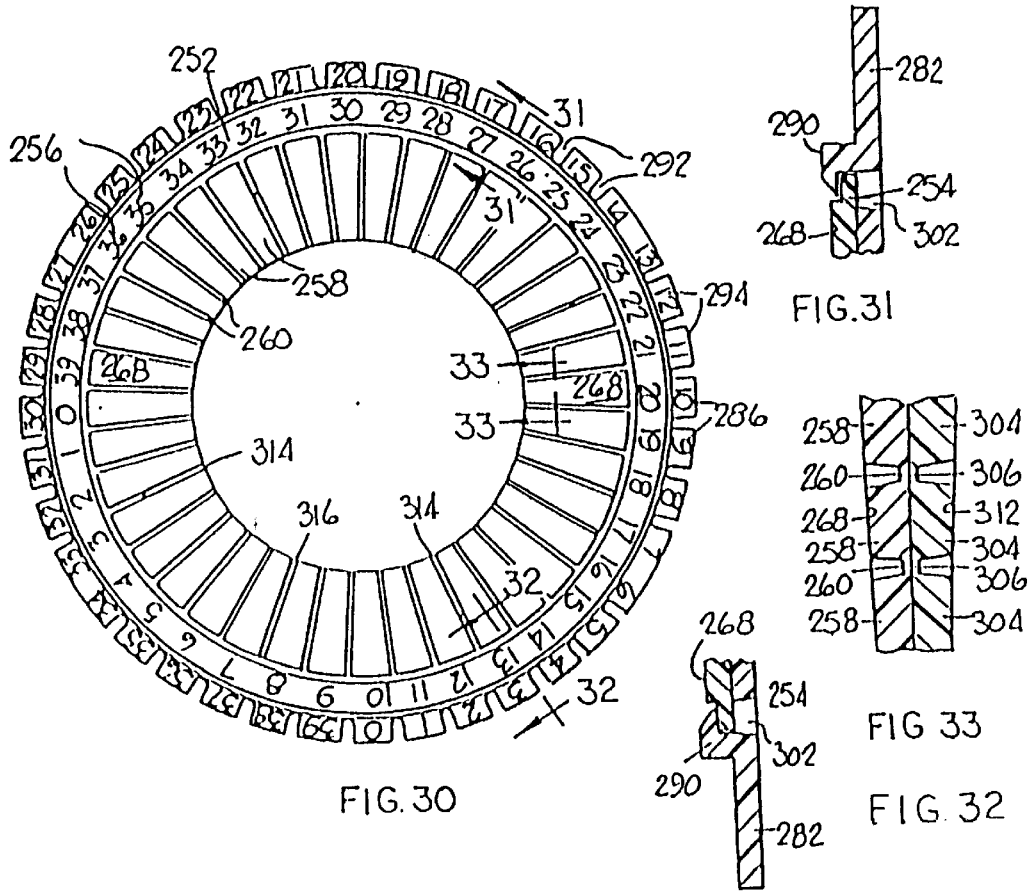
FIG. 30 is a top plan view of FIG. 23 superposed on FIG. 27 with their axes in alignment.
FIG. 31 is a cross-sectional view taken on the line 31—31 of FIG. 29.
FIG. 32 is a cross-sectional view taken on the line 32—32 of FIG. 30.
FIG. 33 is a cross-sectional view taken on the line 33—33 of FIG. 29.

The joined together upper tapered shim 250 and lower tapered shim 280 are illustrated in FIGS. 30–33. As illustrated particularly in FIGS. 31 and 32, the hook like portions 290 extend over portions of the outwardly extending portion 254. The upper tapered shim 250 is positioned over the lower tapered shim 280 and is then moved toward the lower tapered shim 280 to move the hook like portions 290 radially outwardly until the upper tapered shim 250 is close enough to the lower tapered shim 280 so that the hook like portions 290 snap back into the locations illustrated in FIGS. 31 and 32. In some instances, a continuous annular rim spaced from the upper surface 288 can be used instead of the hook like portions 290. The webbing 260 and 306 are in axial alignment and in contacting relationship as illustrated in FIG. 33. It is noted that whatever indicium on the upper tapered shim 250 is radially aligned with any indicium on the lower tapered shim 280, the radially extending members 258 and 304 will be in axial alignment.

After being joined together, the upper and lower tapered shims 250 and 280 are used in the same manner as described above in relation to the upper and lower tapered shims in FIGS. 15 and 16. Also, the upper and lower tapered shims 250 and 280 could be joined with the tapered surfaces 312 in contact with the flat surface 270.

In some instances, it may be desirable to join upper and lower tapered shims, such as 250 and 280, to prevent any relative rotational, axial or radial movement therebetween. This can be accomplished by increasing the frictional contact between the hook like portions 290 and the outwardly extending portion 254 or employing other means to accomplish the same result. In this case, the desired indicium on the upper tapered shim 250 is aligned with the desired indicium on the lower tapered shim 280 and then pressed together. In other instances, it may be desirable to omit the hook like portion 280 and to manually hold the upper and lower tapered shims 250 and 280 in the desired relationship after the appropriate radially extending member 258 and 304 have been removed to provide the clearance for the bolt holes and to install the upper and lower tapered shims 250 and 280 with the desired indicia at the twelve o'clock position.

In further instances, it may be desirable to use only the upper tapered shim 250 by itself. Under these conditions, the alignment of the wheel would be checked to determine the required camber and toe adjustments. A chart, would be used to determine the indicia to be placed at a reference point on the wheel assembly. The template would be used to determine which of the radially extending members would be removed to provide clearance for the bolts and then they would be removed. The upper tapered shim 250 would then be installed using the desired indicium at the reference point on the wheel assembly.

In using the joined together upper and lower tapered shims, the first step is to use a conventional apparatus to determine the required camber and/or toe adjustments. A chart, such as that illustrated in FIGS. 13 and 14 is then used to determine the indicium on the upper tapered shim to be aligned with the indicium on the lower tapered shim to obtain the required camber and/or toe adjustments. A template is then used to identify the radially extending members to be removed to provide the required clearance for the bolts and then to remove them. The shims are checked to ensure that the desired indicium are still in radial alignment. Installing the joined together upper and lower tapered shims between the spindle face plate and the axle face plate with the desired indicium at a reference point on the wheel assembly.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A shim assembly for correcting misalignment of a vehicle wheel spindle extending from a mounting plate attached to a vehicle the shim assembly comprising:

a first tapered shim element having opposed, non-parallel tapered surfaces;

a second tapered shim element having opposed, non-parallel tapered surfaces, at least a portion of one of the tapered surfaces of the first tapered shim element and at least a portion of one of the tapered surfaces of the second tapered shim element being adjacent to and in contact with each other;

said first tapered shim element being rotatably connected to said second tapered shim element; and wherein said first and second tapered shim elements are connected by apparatus comprising:

an arcuate lip defined in one of said first and second shim elements;

at least two circumferentially spaced apart connectors projecting axially outwardly from the other of said first and second shim elements;

each of said at least two circumferentially spaced apart connectors having an arcuate groove formed therein; and at least a portion of said arcuate lip being located in each of said arcuate grooves of said at least two circumferentially spaced apart connectors at all rotational positions of said first and second shim elements to secure said first and second shim elements together as a rotationally adjustable shim assembly.

2. A shim assembly as set forth in claim 1 wherein:

said arcuate lip extends as a full circle and is journalled in said portions of said arcuate grooves.

3. A shim assembly for use in adjusting a vehicle wheel comprising:

a first shim having opposed surfaces at least one of which is tapered;

a second shim having opposed surfaces at least one of which is tapered; and at least one integral connector on one of said first and second shims and at least one mating integral connector on the other of said first and second shims.

4. A shim assembly as in claim 3 and further comprising:

at least one taper indicator on one of said first and second shims and at least one taper indicator on the other of said first and second shims.

\* \* \* \* \*

UNITED STATES PATENT AND TRADEMARK OFFICE
CERTIFICATE OF CORRECTION

PATENT NO.  : 5,836,597
DATED       : 11/17/98
INVENTOR(S) : Schlosser et al.

It is certified that error appears in the above-identified patent and that said Letters Patent is hereby corrected as shown below:

On the title page, Item [73] should read as follows:
    Assignee: Specialty Products Company, Longmont, Colo.

Signed and Sealed this

Twenty-ninth Day of June, 1999

Attest:

Q. TODD DICKINSON

*Attesting Officer*     Acting Commissioner of Patents and Trademarks